United States Patent
Nefzger et al.

(10) Patent No.: US 7,772,321 B2
(45) Date of Patent: Aug. 10, 2010

(54) POLYMER DISPERSIONS IN POLYESTER POLYOLS

(75) Inventors: Hartmut Nefzger, Pulheim (DE); Erika Bauer, Jüchen (DE); Erhard Michels, Köln (DE)

(73) Assignee: Bayer MaterialScience AG., Leverkusen (DE)

( * ) Notice: Subject to any disclaimer, the term of this patent is extended or adjusted under 35 U.S.C. 154(b) by 588 days.

(21) Appl. No.: 10/897,683

(22) Filed: Jul. 22, 2004

(65) Prior Publication Data

US 2005/0027067 A1 Feb. 3, 2005

(30) Foreign Application Priority Data

Aug. 1, 2003 (DE) ................. 103 35 250

(51) Int. Cl.
*C08F 283/02* (2006.01)
*C08F 2/32* (2006.01)
*C08F 257/02* (2006.01)
*C08K 5/10* (2006.01)
*C08G 18/42* (2006.01)

(52) U.S. Cl. ............ 524/513; 524/318; 524/801; 524/533; 524/539

(58) Field of Classification Search ............... 524/533, 524/539, 318, 801, 513
See application file for complete search history.

(56) References Cited

U.S. PATENT DOCUMENTS

| | | | |
|---|---|---|---|
| 3,371,072 A | 2/1968 | Signouret et al. | 260/79 |
| 4,558,075 A * | 12/1985 | Suss et al. | 523/216 |
| 4,681,903 A * | 7/1987 | Haas et al. | 521/167 |
| 5,135,969 A * | 8/1992 | Tooyama et al. | 523/404 |
| 5,449,707 A * | 9/1995 | Higashiura et al. | 523/501 |
| 5,654,344 A * | 8/1997 | Falke et al. | 521/49 |
| 6,166,111 A | 12/2000 | Schneider et al. | 523/501 |
| 6,472,447 B1 | 10/2002 | Lorenz et al. | 521/137 |

FOREIGN PATENT DOCUMENTS

| | | |
|---|---|---|
| DE | 198 50 243 A1 | 5/2000 |
| EP | 0 184 761 A2 | 6/1986 |
| EP | 250 351 | 12/1987 |

* cited by examiner

*Primary Examiner*—William K Cheung
(74) *Attorney, Agent, or Firm*—N. Denise Brown; Noland J. Cheung

(57) ABSTRACT

The present invention relates to polymer dispersions in polyester polyols, a process for producing them and their use for the production of polyurethanes, in particular microcellular polyurethanes. These polyester polyols have sulfur atoms and are free of olefinically unsaturated groups.

4 Claims, No Drawings

POLYMER DISPERSIONS IN POLYESTER POLYOLS

BACKGROUND OF THE INVENTION

The present invention relates to polymer dispersions in polyester polyols, a process for producing them and their use for the production of polyurethanes, in particular microcellular polyurethanes.

Dispersions of solid, high-molecular polymers in polyols (i.e. polymer polyols) are often used for the production of flexible polyurethane foams. The advantage of this, for example, is that the open-cell nature of these foams is increased and the mechanical properties are improved as a result of the increased hardness. In particular, tear strength, tensile stress and compression set are improved. This allows reduced density to be set while maintaining the properties which are otherwise only achievable at higher density. A significant material saving, and thus cost reduction, can thereby be achieved.

Dispersions of polymers in polyols are known in literature, which discloses, in addition to the dispersions obtainable by converting olefin group-containing monomers into polyols, also other types of dispersions such as, e.g., those that are produced from diamines and polyisocyanates. Equally it is clear, that the polyols used are mostly polyether polyols having molar masses of 1,000 to 10,000 g/mol, and less frequently polyester polyols. One reason for this may be the comparatively high viscosity of the polyester polyols themselves and in particular of dispersions based on polyester polyols, in comparison with corresponding systems based on polyether polyols. Nevertheless there is industrial interest in the dispersions based on polyester polyols, in particular because polyurethane systems produced from them have better mechanical properties in many respects than the corresponding polyether-based polyurethanes.

For aqueous systems used in thermosetting stoving enamels, DE-OS 44 27 227 discloses polyester polyols dispersed in water, which are filled with polymers of olefinic monomers, as one of the system components.

If styrene is used in such systems as a vinylic monomer, otherwise analogous dispersions are less stable as a result of its lower reactivity in comparison with acrylonitrile and a chain transfer speed that is lower on several molecule species. As a result of this, the use of styrene as a radically polymerisable vinylic monomer for the production of dispersions based on polyester polyol, requires the incorporation of grafting sites in or at the end of the polyester molecules. This is particularly true if only styrene is used as a vinylic monomer. Such grafting sites must guarantee the chain transfer of the radically growing polymer molecules while forming covalent bonds and, if possible, maintaining the growing radical chain.

Some examples of such modifications are described in EP-A 250 351. Thus, e.g. the incorporation of maleic acid anhydride into the polyester polyol chain can fulfill this function. EP-A 0 250 351 also discloses a process in which at least one ethylenically unsaturated monomer is polymerised in a polyester polyol with a molar mass of 1,000 to 5,000 g/mol. The polyester polyol thus contains, in addition to the conventional structural elements, polycarboxylic acid and polyalcohol, and also olefinic components, specifically the structural element maleic acid anhydride.

The disadvantage of incorporating such unsaturated polycarboxylic acids or anhydrides, which reduce the free movement of the segments of the polyester chain, is however the associated increase in the viscosity of the polyester polyols or polyester polyol mixtures used. Similarly, the increased concentration of polar ester carbonyl functions resulting from the incorporation of maleic acid into the polyester chain has a viscosity-increasing effect. This increased viscosity further reduces the usability of the already per se higher-viscosity polyester polyols.

In addition to these disadvantages, in industrial practice, the polyester polyols modified with unsaturated structural elements have proved in numerous cases to produce coarse-particle dispersions, which mostly contain particles that are visible to the naked eye and are often difficult to filter.

Therefore, an object of the present invention was to provide an improved process for the production of polymer polyols based on polyester polyols. It was discovered that olefinically unsaturated structural elements can be omitted as a component of the polyester polyol, and the resultant polymer polyols nevertheless have a small-particle size and are stable, if modified polyester polyols containing sulfhydryl groups are used as a stabilizer. Thus, the present invention provides polymer dispersions which contain at least one polyester polyol having one or more sulfur atoms.

SUMMARY OF THE INVENTION

The present invention relates to polymer dispersions comprising at least one polyester polyol having one or more sulfur atoms and which is free of olefinically unsaturated groups.

The present invention also provides a process for the production of these polymer dispersions according to the invention. This process comprises radically polymerising one or more olefinically unsaturated monomers in the presence of a polyester polyol having one or more sulfur atoms and which is free of olefinically unsaturated groups, and, optionally, one or more other polyester polyols which are free of olefinically unsaturated groups. The polyester polyol having one or more sulfur atoms preferably has one or more sulfhydryl groups (i.e. —SH groups).

In a variation of the present invention, a base polyester polyol is used in mixture with a sulfhydryl-modified polyester polyol. In another variation, only one single polyester polyol is used, and the sulfhydryl groups are incorporated into the base polyester polyol.

The base polyester polyol is produced from components that have no olefinic structural elements. Base polyester polyols are polycondensation products of diols and dicarboxylic acids, or their anhydrides, or low molecular esters or semi-esters, having hydroxyl terminal groups, preferably those with monofunctional alcohols such as, for example, methanol, ethanol, 1-propanol, 2-propanol, 1-butanol and 2-butanol.

Examples of suitable diols includes compounds such as ethylene glycol, 1,2-propane diol, 1,3-propane diol, 2-methyl-1,3-propane diol, 1,4-butane diol, 1,5-pentane diol, 3-methyl-1,5-pentane diol, 1,6-hexane diol, 1,8-octane diol, 1,10-decane diol, neopentyl glycol, diethylene glycol, triethylene glycol, tetraethylene glycol, etc. Polyether polyols with number average molar masses of 250 to 4,500 g/mol, and in particular those that contain predominantly units derived from 1,2-propylene oxide, are also suitable to be used as diols. Accordingly, ether oligomers of butane diol, such as dibutylene glycol, tributylene glycol, or the corresponding diols obtainable by ring-opening polymerization of tetrahydrofuran with number average molar masses of 240 to 3,000 g/mol may also be used as diols. Corresponding compounds of 1,6-hexane diol, di- and tri-hexylene glycol or oligomer mixtures, which may be obtained by azeotropic etherification of 1,6-hexane diol, are also suitable.

In addition to these, up to 5 wt. % of higher-functional polyols can also be used. This includes compounds such as, for example, 1,1,1-trimethylol propane, glycerine or pentaerythritol, and also polypropylene oxide- and polyethylene oxide polyols started on these compounds, with number average molar masses of 250 to 4,500 g/mol.

Aliphatic and aromatic compounds can be used alone or in mixture as suitable dicarboxylic acids without olefin groupings. Some examples include: succinic acid, glutaric acid, adipic acid, pimelic acid, suberic acid, sebacic acid, phthalic acid, isophthalic acid, terephthalic acid. Besides these, the corresponding anhydrides, and also their esters or semi-esters with low-molecular, in particular monofunctional, alcohols can also be used.

Similarly, esters of cyclic hydroxyl carboxylic acids, including preferably, those that can be produced from ε-caprolactone, may be used.

Accordingly, polyesters of carbonic acid, or the so-called polycarbonate polyols, may be used or additionally used. These can be produced by transesterification of dimethyl carbonate or diphenyl carbonate with diols and triols, and also by transesterification with hydroxyl terminal oligoester- and oligoether diols with number average molar masses of 200 to 1,000 g/mol.

The polyester polyols to be used in accordance with the present invention have an average hydroxyl functionality of 1.8 to 3, preferably 1.85 to 2.7, particularly preferably 1.9 to 2.5, and also a number average molar mass of 1,000 to 5,000, preferably 1,300 to 4,800, and particularly preferably 1,600 to 4,500 g/mol.

If several polyester polyols are used, the limits for molar mass given in the paragraph above are in relation to the polyester polyol mixture. In this case, the number average molecular weight of at least one of the individual components may of course also lie outside the given limits such as, e.g. in the range of 450 to 1,600 g/mol.

Sulfhydryl-modified polyester polyols contain at least one sulfhydryl group —SH. This sulfhydryl group can be incorporated into a hydroxyl group-terminated polyester polyol, for example, by condensation. A preferred process variation for this is so-called azeotropic esterification, in which a hydroxyl group-terminated polyester polyol reacts with a sulfhydryl group-containing carboxylic acid and/or sulfhydryl group-containing carboxylic acid derivatives, in the presence of an entrainer and also, optionally, in the presence of an esterification or transesterification catalyst.

All base polyester polyols are possible starting components for the sulfhydryl-modified polyester polyols herein. Those polyester polyols that contain at least one structural element having a functionality greater than 2 are preferred. Suitable sulfhydryl group-containing carboxylic acids and carboxylic acid derivatives include those compounds which correspond to the following formula:

$(HS)_m-R^1-(COOR^2)_n$      (I)

wherein:
- m and n: each independently of each other represent a value ≧1,
- $R^1$: represents an alkylene group having 1 to 11 carbon atoms, preferably 1 to 5 carbon atoms, particularly preferably 1 carbon atom or alkylidene group having 1 to 11 carbon atoms, preferably 1 to 5 carbon atoms, particularly preferably 1 carbon atom; and
- $R^2$: represents an alkyl group having 1 to 5 carbon atoms, preferably 1 to 2 carbon atoms, or a hydrogen atom.

Examples of suitable sulfhydryl group containing carboxylic acids and carboxylic derivatives include mercaptoacetic acid (wherein in the above formula: m=n=1; $R^1$=$CH_2$; and $R^2$=H), mercaptopropionic acid (wherein in the above formula: m=n=1; $R^1$=$(CH_2)_2$; and $R^2$=H), methyl thioglycolate (wherein in the above formula: m=n=1; $R^1$=$CH_2$; and R=$CH_3$), thiolactic acid (wherein in the above formula: m=n=1; $R^1$=$CH(CH_3)$; and $R^2$=H), and also 2,3-dithiomeso-tartaric acid (wherein in the above formula: m=n=2; $R^1$=CHCH and $R^2$=H). Mercaptoacetic acid and mercaptopropionic acid are preferred.

All organic solvents with boiling points of from about 60 to about 160° C. are suitable to be used as possible entrainers for the reaction. Toluene, benzene, xylene or dioxane are preferred. The proportion of entrainer is selected in such a way, that the temperature of the reaction mixture is from about 95° C. to about 180° C., preferably from about 100° C. to about 160° C., with normal pressure conventionally being selected as the pressure. However reduced pressure (of about 1012 to about 200 mbar) and increased pressure (of about 1 to about 1.5 bar) can also be used.

Suitable compounds to be used as esterification catalysts and/or transesterification catalysts include those compounds known to the person skilled in the art. Some examples include compounds encompassing, e.g. strong protonic acids such as p-toluenesulfonic acid, or metal atom-containing compounds such as titanium tetrabutylate, tin chloride, etc.

In another variation of the present invention, the sulfhydryl-modified polyester polyol is produced by polycondensation from bifunctional carboxylic acids that optionally contain small proportions of higher-functional carboxylic acids, and bifunctional alcohols that optionally contain small proportions of higher functional alcohols, e.g. triols, and also sulfhydryl group-containing carboxylic acids or carboxylic acid derivatives which correspond to the formula set forth hereinabove.

In accordance with the present invention, the sulfhydryl-modified polyester polyol produced by the process described herein, contains less than 10 wt. %, preferably 0.1 to 10 wt. %, and more preferably 2 to 7 wt. % of sulfur (based on 100% by wt. of the sulfhydryl-modified polyester polyol).

In relation to all polyester polyol components present, the proportion of sulfhydryl-modified polyester polyol in the base polyester polyol mixture is less than 5 wt. %, preferably less than 3 wt. %, and more preferably less than 1 wt. % (based on 100% by weight of the combined weight of all polyester polyols).

Furthermore, the base polyester polyols can also be modified by admixing low-molecular diols or diol mixtures with number average molar masses of 62 to 400 g/mol, and which bear no ester groups (i.e. are free of ester groups), to the esters used. This mixing may also take place into the per se finished dispersion after completion of radical polymerization.

Some examples of suitable radically polymerizable vinyl monomers include, but are not limited to, styrene, α-methyl styrene, ethyl styrene, vinyl toluene, divinyl benzene, isopropyl styrene, chloro styrene, butadiene, isoprene, pentadiene, acrylic acid, methacrylic acid, methacrylic acid methyl ester, vinyl acetate, acrylonitrile, methyl vinyl ketone, or combinations of these compounds. Styrene, α-methyl styrene, acrylonitrile, methacrylonitrile, methacrylic acid alkyl esters having $C_1$-$C_{30}$ alkyl groups (e.g. methyl-, ethyl-, butyl-, hexyl-, dodecyl-, etc) are preferred. Styrene and acrylonitrile are more preferred, with styrene being preferably used in a proportion of more than 75 wt. %, particularly preferably of more than 90 wt. %.

The proportion of these free-radically polymerizable vinyl monomers to be used in accordance with the present invention, based on the total weight of the whole charge (i.e. the solids content of the finished dispersion), is from about 2 to about 55 wt. %, preferably from about 4 to about 40 wt. %, and more preferably from about 5 to about 33 wt. %. The solids content can be adjusted by subsequent dilution with a second base polyester polyol.

In a preferred embodiment of the present invention, two different polyester polyols are used as the base polyester polyol. These two different polyester polyols should differ at least in their number average molecular weight, with the polyester polyol having the lower (number average) molecular weight being admixed only when the free-radical polymerization of the vinylic monomer in the mixture of the base polyester polyol having the higher molecular weight and the sulfhydryl-modified polyester polyol is complete.

To initiate free-radical polymerization, the known free-radical starters or initiators are typically used. Some examples from the group of the known azo-initiators include α,α-azo-2-methyl butyronitrile, α,α-azo-2-heptonitrile, 1,1'-azo-1-cyclohexane carbonitrile, dimethyl-α,α-azo-isobutyrate, 4,4'-azo-4-cyanopentanoic acid, azo-bis(2-methylbutyronitrile), azo-bis-isobutyronitrile, etc. Examples of known suitable initiators from the group of peroxides, persulfates, perborates, and percarbonates include compounds such as: dibenzoyl peroxide, acetyl peroxide, benzoyl hydroperoxide, t-butyl hydroperoxide, di-t-butyl peroxide, 2-ethylhexanoic acid-tert. butyl perester, diisopropyl peroxydicarbonate, etc.

Polymerization is typically carried out in the presence of a solvent, but can also be effected without solvent. The following can be used as, for example, suitable solvents: benzene, toluene, xylene, acetonitrile, hexane, heptane, dioxane, ethyl acetate, N,N-dimethyl formamide, N,N-dimethyl acetamide, etc. Benzene, xylene and toluene are preferred solvents.

The present invention also provides the polymer dispersions obtained by the process according to the invention. The products obtained are white dispersions, which contain a high-molecular polymer or copolymer, a conventional polyester polyol that is solid or preferably liquid at room temperature and a further modified polyester polyol is required for phase stabilization. These dispersions may, for example, at a fill (i.e. solids) level of 25 wt. % polystyrene and an OH number of 50 to 60, exhibit viscosities of about 15,000 to about 35,000 mPas at 25° C., and about 3,000 to 8,000 mPas at 50° C. The viscosity of the polymer dispersion is proportional to the viscosity of the base polyester polyol used, and conversely proportional to the OH number of the base polyester polyol.

The polymer polyols produced in accordance with the present invention are suitable for the production of polyurethanes or polyurethane materials. More specifically, these polymer polyols are suitable for the production of microcellular polyurethane elastomers, such as those used, for example, for the manufacture of shoe soles. The present invention also provides shoe soles which comprise the reaction product of the polymer dispersions (i.e. polymer polyols) according to the invention with polyisocyanates or polyisocyanate prepolymers.

With the polymer dispersions (i.e. polymer polyols) according to the present invention, polyurethanes can be obtained which, in comparison with polyurethanes that are produced without the polymer dispersion, have greater hardness at the same density. If, in addition to the density, the hardness must also be kept constant, when using the polymer dispersions according to the invention, it is possible to work with a significantly reduced quantity of polyisocyanate.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

A) Production of the base polyester polyols
B) Production of the sulfhydryl-modified polyester polyols
C) Production of polymer dispersions according to the invention
D) Reference examples
E) Processing examples A) Production of the Base Polyester Polyols:

A.1 Base Polyester Polyol with High Molecular Weight:

2779 g (26.22 mol) diethylene glycol, 813 g (13.12 mol) ethylene glycol and 5452 g (37.12 mol) adipic acid were heated slowly to about 200° C. with separation of water. After water formation had ended, the mixture was cooled to about 120° C. and catalyzed with 180 mg tin dichloride. The reaction mixture was slowly heated to about 200° C. over 4 hours in a water jet pump, with the separation of additional water. It was left for a further 24 hours at these reaction conditions, and then the hydroxyl number and acid number were determined. The resultant base polyester polyol had a hydroxyl number of 27.8 mg KOH/g and an acid number of 0.8 mg KOH/g.

A.2 Base Polyester Polyol with Low Molecular Weight:

3177 g (29.97 mol) diethylene glycol, 932 g (15.03 mol) ethylene glycol and 5256 g (36 mol) adipic acid were heated slowly to about 200° C. with the separation of water. After water formation had ended, the mixture was cooled to about 120° C. and catalyzed with 180 mg tin dichloride. The reaction mixture was slowly heated to about 200° C. over 4 hours in a water jet pump, with the separation of additional water. It was left for a further 24 h at these reaction conditions, and then the hydroxyl number and acid number were determined. The resultant base polyester polyol had a hydroxyl number of 120.1 mg KOH/g and an acid number of 0.3 mg KOH/g.

B) Production of the Sulfhydryl-Modified Polyester Polyols

B.1. Additive Produced from the Individual Components with Mercaptoacetic Acid:

134 g (1 mol) 1,1,1-trimethylolpropane (TMP), 370 g (ca 1 mol) of a polyethylene glycol with an OH number of 228, 146 g (1 mol) adipic acid and 92 g (1 mol) mercaptoacetic acid were mixed with 100 g toluene and 0.7 g p-toluenesulfonic acid. At about 140 to about 145° C., 54 g (3 mol) water was separated off azeotropically at the water separator. The toluene was then distilled off. The resultant sulfhydryl-modified polyester polyol had an OH number of 202 mg KOH/g, an acid number of 26 mg KOH/g, and a viscosity of 820 mPas (at 25° C.) or of 190 mPas (at 50° C.).

B.2. Additive Produced by Reacting a Polyester Polyol with Mercaptoacetic Acid:

580 g (0.2 mol) of a polyadipate with the structural elements diethylene glycol and TMP, with a number average molar mass of 2900 g/mol, and a functionality of about 3 (commercially available from Bayer AG), 18.4 g (0.2 mol) mercaptoacetic acid and 0.6 g p-toluenesulfonic acid were dissolved in 100 ml toluene. At about 140 to about 145° C., 3.6 g (0.2 mol) water was separated off azeotropically at the water separator. The toluene was then distilled off. The resultant sulfhydryl-modified polyester polyol had an OH number of 47.7 mg KOH/g, an acid number of 14.8 mg KOH/g, and a viscosity of 20,850 mPas (at 25° C.) or of 4,020 mPas (at 50° C.).

C) Production of Polymer Dispersions According to the Invention:

TABLE 1

Summary of the examples according to the invention

| Example | Number of base polyester polyols | | Addition of short-chain diol | | Polyesters having sulfhydryl groups |
|---------|------|------|----------|----------------|-------|
|         | One  | Two  | In batch | In finished dispersion | |
| C.1.    | X    |      | X        |                | B.1. |
| C.2.    | X    |      |          | X              | B.1. |
| C.3.    | X    |      | X        |                | B.2. |
| C.4.    |      | X    |          |                | B.2. |

C.1. Polyester Polyol from B.1. as Additive Admixing of Diethylene Glycol Before Polymerization of the Vinylic Monomer:

476 g of a polyadipate (commercially available from Bayer AG) with a hydroxyl number of 56 mg KOH/g were stirred up with 3 g of sulfhydryl group-containing polyester polyol produced as described above under B.1., 100 g toluene, 27 g diethylene glycol and 1 g azo-bis-(2-methyl-butyronitrile). A weak nitrogen stream was fed through the solution for 20 min., 80 g styrene was added and the mixture was heated while stirring for about 30 minutes to about 80° C. After holding the mixture for about 20 mm. at about 80° C., the temperature was increased to about 120° C. over another 30 min.

A previously prepared solution of 600 g of the same polyadipate as used above with a hydroxyl number of 56 mg KOH/g, 14.3 g of the sulfhydryl group-containing polyester polyol produced in example B.1., 200 g toluene, 5.4 g azo-bis(2-methylbutyronitrile) and 420 g styrene were dosed into the mixture described above over 2 hours at an initial stirrer speed of 300 rpm. After about 20 min., the speed was increased to 350 rpm and after a further 40 minutes to 400 rpm. At the end of this dosing, the mixture was left to react for 5 min.

Another previously-prepared solution of 38 g of the same polyadipate as above, with a hydroxyl number of 56 mg KOH/g, 3.5 g of the sulfhydryl group-containing polyester polyol produced in example B.1., 50 g toluene and 1 g azo-bis(2-methylbutyronitrile) was then dosed into the above mixture within 30 min. Once addition was complete, the mixture was left to react for 2 h. at 120° C.

For working up, a water jet pump was first applied to the reaction mixture to remove most of the solvent and any unreacted styrene. In order to complete the process, an oil pump vacuum was applied which removed as much as possible of both the styrene and toluene after 2 h. at 0.5 mbar.

The still-warm charge was filtered through a 200 μm sieve within 4 min. until free of residue, without applying pressure, with the aid of a heatable nutsch filter.

The OH number of the resultant dispersion was 53.1 mg KOH/g, the acid number was 1 mg KOH/g, and the viscosity was 24,600 mPas (at 25° C.) or 5,060 mPas (at 50° C.). The fill level (i.e. solids content) of the dispersion was 26 wt. %.

C.2. Polyester Polyol from B.1. as an Additive, Admixing Diethylene Glycol to the Finished Dispersion:

| Batch: | 476 g | polyadipate, OH no. 50 mg KOH/g (commerically available from Bayer AG) |
|--------|-------|---------|
|        | 3.0 g | sulfhydryl group containing polyester polyol from example B.1. |
|        | 100 g | toluene |
|        | 80 g  | styrene |
|        | 1.0 g | azo-bis(2-methylbutyronitrile) | were prepared as described in example C.1. and provided at 115° C. To this mixture, as described in example C.1., the following mixtures were dosed in:

| Dose 1: | 600 g  | polyadipate, OH no. 50 mg KOH/g |
|---------|--------|---------|
|         | 14.3 g | sulfhydryl group containing polyester polyol from example B.1. |
|         | 200 g  | toluene |
|         | 420 g  | styrene |
|         | 5.4 g  | azo-bis(2-methylbutyronitrile) |
| Dose 2: | 38 g   | polyadipate, OH no. 50 mg KOH/g (Desmophen ® DE 2100, Bayer AG) |
|         | 3.5 g  | sulfhydryl group containing polyester polyol from example B.1. |
|         | 50 g   | toluene |
|         | 0.6 g  | azo-bis(2-methylbutyronitrile) |

The resultant reaction mixture was worked up as in example C.1. above.

The resultant dispersion was mixed with 43 g diethylene glycol, then filtered through a 200 μm sieve. The final dispersion was phase stable and had a viscosity of 35,200 mPas (at 25° C.) or 7,310 mPas (at 50° C.); a fill level (i.e. solids content) of about 26 wt. %; and an OH number of about 58.6 mg KOH/g. The acid number was 0.8 mg KOH/g.

C.3. Polyester Polyol from B.2. as an Additive

| Batch: | 476 g | polyadipate, OH no. 50 mg KOH/g (commercially available from Bayer AG) |
|--------|-------|---------|
|        | 3.0 g | sulfhydryl group containing polyester polyol from example B.2. |
|        | 100 g | toluene |
|        | 80 g  | styrene |
|        | 1.0 g | azo-bis(2-methylbutyronitrile) |
|        | 43 g  | diethylene glycol | were provided at 115° C. and the following mixtures were added. See example C.1. for further details:

| Dose 1: | 600 g  | polyadipate, OH no. 50 mg KOH/g |
|---------|--------|---------|
|         | 14.3 g | sulfhydryl group containing polyester polyol from example B.2. |
|         | 200 g  | toluene |
|         | 420 g  | styrene |
|         | 5.4 g  | azo-bis(2-methylbutyronitrile) |
| Dose 2: | 38 g   | polyadipate, OH no. 50 mg KOH/g |
|         | 3.5 g  | sulfhydryl group containing polyester polyol from example B.2. |
|         | 50 g   | toluene |
|         | 0.6 g  | azo-bis(2-methylbutyronitrile) |

The resultant mixture was worked up as described in example C.1.

The resultant dispersion could be filtered through a 200 μm sieve. This dispersion was phase stable and had a viscosity of 34,900 mPas at 25° C. or of 7,230 mPas at 50° C. The dispersion was characterized by a fill level (solids content) ca. 25.5 wt. %; an OH number of 54.8 mg KOH/g; and an acid number of 0.6 mg KOH/g.

C.4. Polyester Polyol of B.2. as an Additive, Dilution with Low-Molecular-Weight Polyester Polyol

| Batch: | 476 g | polyester polyol from example A.1., OH no. 27.8 mg KOH/g |
|---|---|---|
| | 3.0 g | sulfhydryl group containing polyester polyol from example B.2. |
| | 100 g | toluene |
| | 80 g | styrene |
| | 1.0 g | azo-bis(2-methylbutyronitrile) | were provided at 115° C. and the following mixtures were added. See example C.1. for further details.

| Dose 1: | 600 g | polyester polyol from example A.1., OH no. 27.8 mg KOH/g |
|---|---|---|
| | 21 g | sulfhydryl group containing polyester polyol from example B.2. |
| | 200 g | toluene |
| | 800 g | styrene |
| | 6.4 g | azo-bis(2-methylbutyronitrile) |
| Dose 2: | 38 g | polyester polyol from example A.1., OH no. 27.8 mg KOH/g |
| | 4 g | sulfhydryl group containing polyester polyol from example B.2. |
| | 100 g | toluene |
| | 0.6 g | azo-bis(2-methylbutyronitrile) |

The dispersion obtained contained at this point ca. 40 wt. % solid matter.

| Dose 3: | 1119 g | polyester polyol from example A.2., OH no. 120.1 mg KOH/g. |
|---|---|---|

The mixture was worked up as described in example C.1. above.

The resultant dispersion could be filtered through a 100 μm sieve, was phase stable and had a viscosity of 27,530 mPas (at 25° C.) or of 5,860 mPas (at 50° C.). The fill level (i.e. solids content) was about 23.1 wt. %. This dispersion had an OH no. of about 57.8 mg KOH/g, and an acid no. of about 0.3 mg KOH/g.

D) Reference Examples:

D.1. Synthesis of Double Bond-Containing Additives:

D.1.1. Production of an Acrylate Terminal Group-Containing Polyether Polyol:

144 g acrylic acid methyl ester were added slowly at 50° C. to 4000 g of a polyoxypropylene polyol started on TMP with an OH number of 28 mg KOH/g and 1 g titanium tetraisobutylate. Methanol was removed from the reaction mixture at increased temperature.

The OH number of the acrylate terminal group-containing polyether polyol was 21 mg KOH/g; and the viscosity was 1,700 mPas at 25° C.

D.1.2. Production of a Maleic Acid-Containing Polyester Polyol:

1148 g (7.65 mol) triethylene glycol and 583 g (5.95 mol) maleic acid anhydride, and 0.5 g hydroquinone were reacted with tin dichloride catalysis (40 mg) in a melt polycondensation reaction at 200° C. with the separation of water, finally in a vacuum. The OH number of the resultant maleic acid-containing polyester polyol was 93.1 mg KOH/g; the acid number was 0.9 mg KOH/g, and the viscosity was 1,070 mPas at 75° C.

D1.3. Production of a Maleic Acid Containing Polyester Polyol:

5548 g (38 mol) adipic acid, 196 g (2 mol) maleic acid anhydride, 1728 g (27.87 mol) ethylene glycol and 1728 g (16.3 mol) diethylene glycol (16.3 mol) were reacted with tin chloride catalysis (200 mg) in a melt polycondensation reaction at 200° C. with separation of water, finally in a vacuum. The resultant maleic acid-containing polyester polyol had an OH number of 55 mg KOH/g; an acid number of 0.2 mg KOH/g, and a viscosity of 12,550 mPas at 25° C.

D.2. Use of Double Bond-Containing Additives from Examples D.1.1, D.1.2 and D.1.3 for the Production of Polymer-Filled Dispersions:

D.2.1. Use of the Additive From Example D.1.1.

| Batch: | 476 g | polyadipate, OH no. 56 mg KOH/g (commercially available from Bayer AG) |
|---|---|---|
| | 8.7 g | additive from example D.1.1. |
| | 200 g | toluene |
| | 80 g | styrene |
| | 0.6 g | azo-bis(2-methylbutyronitrile) | were provided at 115° C. and the following mixtures were added. See example C.1. for further details.

| Dose 1: | 538 g | polyadipate, OH no. 56 mg KOH/g |
|---|---|---|
| | 43 g | additive from example D.1.1. |
| | 200 g | toluene |
| | 738 g | styrene |
| | 5.4 g | azo-bis(2-methylbutyronitrile) |
| Dose 2: | 100 g | polyadipate, OH no. 56 mg KOH/g |
| | 10.4 g | additive from example D.1.1. |
| | 50 g | toluene |

The dispersion obtained was unstable, and it formed two phases. The fill level of this product was ca 40 wt. %.

D.2.2. Use of the Additive From Example D.1.2.

| Batch: | 476 g | polyester polyol with a molar ratio ethylene glycol:diethylene glycol of 1:1, and an OH no. of 98.1 mg KOH/g |
|---|---|---|
| | 8.7 g | additive from example D.1.2. |
| | 100 g | toluene |
| | 80 g | styrene |
| | 0.6 g | azo-bis(2-methylbutyronitrile) |
| | 33 g | isopropanol | were provided at 115° C. and the following mixtures were added. See example C.1. for further details.

| | | |
|---|---|---|
| Dose 1: | 600 g | polyester polyol with a molar ratio ethylene glycol:diethylene glycol of 1:1, OH no. of 98.1 mg KOH/g |
| | 43 g | additive from example D.1.2. |
| | 200 g | toluene |
| | 533 g | styrene |
| | 5.4 g | azo-bis(2-methylbutyronitrile) |
| Dose 2: | 38 g | polyester polyol with a molar ratio of ethylene glycol:diethylene glycol of 1:1, OH no. of 98.1 mg KOH/g |
| | 10.4 g | additive from example D.1.2. |
| | 0.6 g | azo-bis(2-methylbutyronitrile) |
| | 50 g | toluene |

The resultant dispersion could not be filtered through a 200 μm sieve.

D.2.3. Use of the Additive From Example D.1.3.

| | | |
|---|---|---|
| Batch: | 830 g | polyester polyol with a molar ratio ethylene glycol:butane diol:diethylene glycol of 2:1:1, and an OH no. of 60 mg KOH/g |
| | 50 g | toluene | were provided at 120° C. and the following mixture was dosed in. See example C.1. for further details.

| | | |
|---|---|---|
| Dose 1: | 353 g | polyester polyol with a molar ratio ethylene glycol:butane diol:diethylene glycol of 2:1:1, OH no. of 60 mg KOH/g |
| | 62 g | additive from example D.1.3. |
| | 523 g | styrene |
| | 13 g | azo-bis(2-methylbutyronitrile) |
| | 200 g | styrene |

The reaction product could not be filtered through a 200 μm sieve.

E) Production of PUR Molded Bodies

The polyurethane test bodies were produced by mixing the isocyanate group-containing A component at 40° C. in a low-pressure processing machine with the polyol-containing B component at 45° C., dosing the mixture into an aluminium mold at a temperature of 50° C. (mold size 200×200×10 mm), closing the mold and releasing the elastomer from the mold after 4 minutes.

The hardness (Shore A) of the resultant elastomer sheets was measured after 24 h storage according to DIN 53 505.

E.1. Processing of the Polymer Dispersions from Example C.4

An NCO-terminated prepolymer (A) based on 4,4'-MDI and a polyadipate (comprising the reaction product of adipic acid, ethylene glycol, and butane diol, and having an OH number of 56) with an NCO content of 19 wt. % was processed as disclosed above in E) with a mixture (B1) of

| | |
|---|---|
| 49.70 wt. % | polyester polyol comprising the reaction product of adipic acid, ethylene glycol and diethylene glycol, and having an OH no. of 56 |
| 36.46 wt. % | polymer dispersion from example C.4. |
| 11.40 wt. % | ethane diol |
| 0.82 wt. % | triethanol amine |
| 0.46 wt. % | diazabicyclo[2.2.2]octane |
| 1.07 wt. % | water |
| 0.09 wt. % | cell stabilizer (commercially available as Dabco ® DC 193 from Air Products) |

The mix ratio of components (B) to (A) was 100:118 wt. %, and the resulting free foam density was 145 kg/m³. The molded bodies, which could be released from the molds after 4 min., and a molded body density of 350 kg/m³, had a Shore A hardness of 71.

E.2. Processing of the Polymer Dispersion from Example C.4

The same prepolymer (A) as described in E.1. above was processed as disclosed with a mixture (B2) which comprised:

| | |
|---|---|
| 51.52 wt. % | polyester polyol comprising the reaction product of adipic acid, ethylene glycol, and diethylene glycol, and having an OH number of 56 |
| 37.10 wt. % | polymer dispersion from example C.4. |
| 8.90 wt. % | ethane diol |
| 0.82 wt. % | triethanol amine |
| 0.46 wt % | diazabicyclo[2.2.2]octane |
| 1.07 wt. % | water |
| 0.13 wt. % | cell stabilizer (commercially available as Dabco ® DC 193 from Air Products) |

The mix ratio of the components (B2) to (A) was 100:102 wt. %, and the resulting free foam density was 153 kg/m³. The molded bodies, which could be released from the molds after 4 min. mold residence time, and a molded body density of 350 kg/m³, had a Shore A hardness of 55.

E.3. Reference Example for Production of PUR Molded Body:

The prepolymer (A) as described in E.1. above was processed as disclosed in E) above with a mixture (B3) which comprised:

| | |
|---|---|
| 86.16 wt. % | polyester polyol comprising the reaction product of adipic acid, ethylene glycol, and diethylene glycol, and having an OH number of 56 ethane diol |
| 11.40 wt. % | triethanol amine |
| 0.82 wt. % | diazabicyclo[2.2.2]octane |
| 0.46 wt. % | water |
| 1.07 wt. % | cell stabilizer (commercially available as Dabco ® DC 193 from Air Products) |
| 0.09 wt. % | |

The mix ratio of components (B3) to (A) was 100:117 wt. %, and the resulting free foam density was 150 kg/m³. The test bodies, which could be released from the molds after 4 min. mold residence time, and a molded body density of 350 kg/m³, had a Shore A hardness of 56.

As the reference example shows, with a conventional formulation, the polyol component of which contains 11.40 wt. % ethane diol, at a polyol:polyisocyanate mix ratio of 100:117, the resultant materials have a Shore A hardness of 56. If a 49.7:36.5 mix of the conventional polyol is used as the 'B' component with the polymer dispersion from example C.4. according to the invention, with a constant proportion of ethane diol, a material with a hardness greater by about 15 Shore A units is obtained (see example E.1.) at virtually the same polyol:polyisocyanate mix ratio of 100:118. By reducing the proportion of ethane diol, a Shore A hardness of 56 can be achieved again. This goes along with a changed mix ratio of polyol:polyisocyanate of 100:102 (see example E.2.).

It is evident from the examples that the use of the polymer dispersions according to the invention at unchanged density, results in an increase in hardness. If, in addition to the density, the hardness is also to be kept constant, it is possible to work with a significantly reduced quantity of polyisocyanate.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of polymer dispersions comprising free-radically polymerizing styrene in the presence of a) at least one polyester polyol having sulfur atoms and that is free of olefinically unsaturated groups, and b) a solvent selected from the group consisting of benzene, xylene and toluene; wherein the polyester polyol having sulfur atoms comprises the reaction product of (1) one or more base polyester polyols, with (2) one or more compounds corresponding to the formula:

$$(HS)_m-R^1-(COOR^2)_n$$

wherein:
m and n: each independently of each other represent a value $\geq 1$,
$R^1$: represents an alkylene group with 1 to 11 carbon atoms or an alkylidene group with 1 to 11 carbon atoms, and
$R^2$: represents an alkyl group with 1 to 5 carbon atoms or a hydrogen atom.

2. The process of claim 1, wherein the polyester polyol having sulfur atoms comprises the reaction product of (1) one or more base polyester polyols with (2) mercaptoacetic acid.

3. The process one of claim 2, wherein said polyester polyol is based on a polycarbonate polyol.

4. The process of claim 1, additionally comprising at least one or more second polyester polyols that are free of sulfur atoms and free of olefinically unsaturated groups.

* * * * *